May 24, 1932.　　　　O. ZANCAN　　　　1,859,351
FRONT DRIVE MECHANISM FOR MOTOR VEHICLES
Filed June 3, 1929　　　3 Sheets-Sheet 3
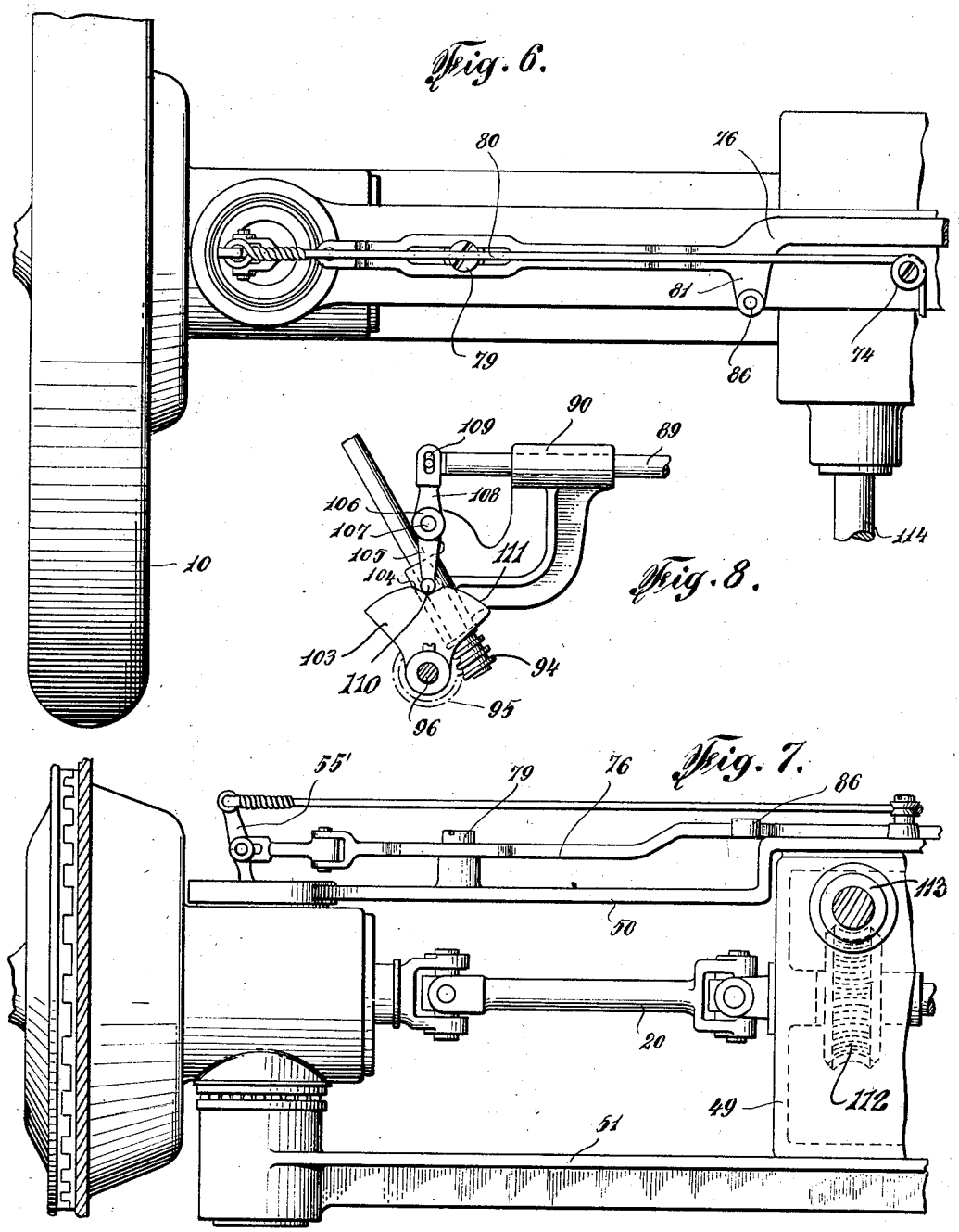
INVENTOR
Ottavio Zancan
BY
ATTORNEY Patented May 24, 1932

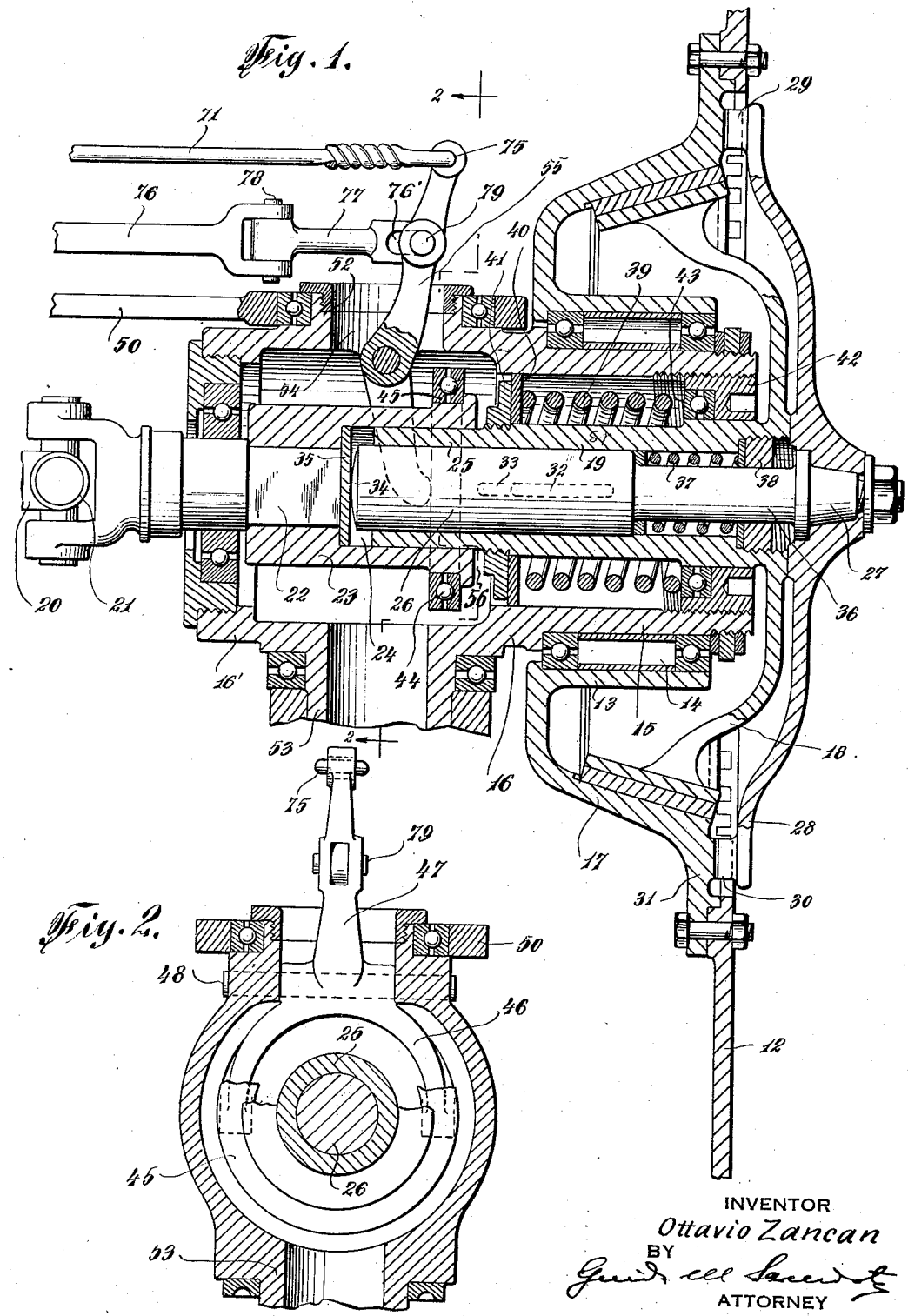

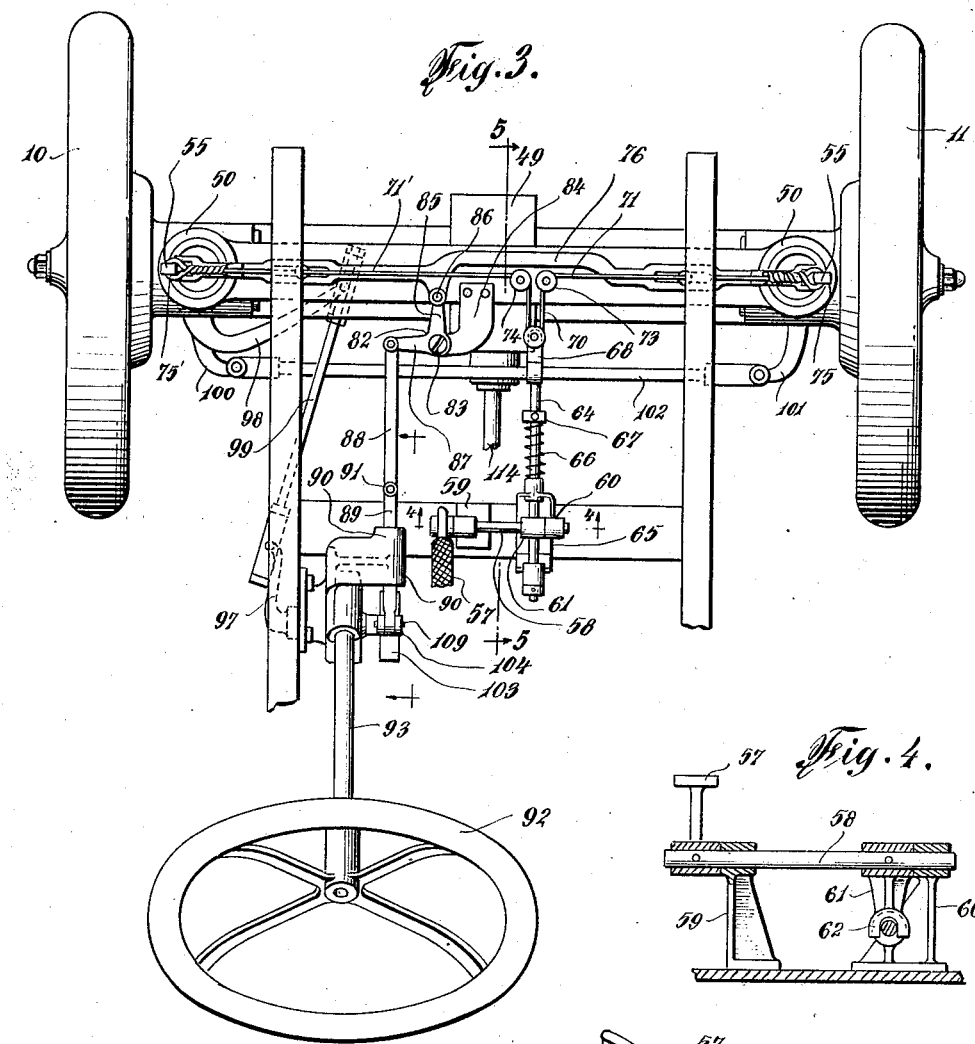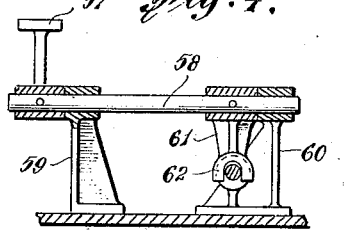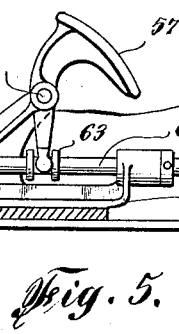

1,859,351

UNITED STATES PATENT OFFICE

OTTAVIO ZANCAN, OF NEW YORK, N. Y.

FRONT DRIVE MECHANISM FOR MOTOR VEHICLES

Application filed June 3, 1929. Serial No. 367,960.

This invention relates to means for driving motor vehicles and more particularly refers to a driving arrangement whereby the differential gearing generally used can be dispensed with as well as the clutch connecting the driving shaft to the engine.

The primary object of this invention is to provide a novel and improved driving arrangement for motor vehicles, especially suitable for front driving, whereby the wheels at opposite ends of the same shaft may be independently connected thereto or disconnected therefrom, in order to do away with the use of a differential when said wheels rotate at different speeds during turning movements of the vehicle.

Another object of this invention is to provide in a driving mechanism of the type where wheels mounted at opposite ends of the same shaft may be connected thereto or disconnected therefrom independently of each other, means for automatically operating the connecting or disconnecting means so as to free one of the wheels from the axle when said wheels are steered to turn the car to one side or the other.

A further object is to provide in a mechanism of the character specified, means insuring a positive connection between each wheel and the shaft by which said wheel may be driven, so as to prevent the possibility of slippage during periods of hard driving.

A still further object is to provide a mechanism of the class specified, adapted to be automatically operated by the steering of the wheels, and adapted also to be controlled by the driver, so as to disconnect the wheels from the shaft when the engine starts running.

Other objects and advantages of the present invention will more fully appear as the description proceeds and will be set forth and claimed in the appended claims.

In a previous patent for driving means for motor vehicles, No. 1,598,904, granted to me September 7, 1926, I have described a driving mechanism comprising a driving shaft and a wheel at each end of said shaft, said wheels being adapted to be independently connected to or disconnected from said shaft by means of a friction clutch.

The operation of one or the other clutch to disconnect its respective wheel from the shaft takes place automatically upon the operation of the steering mechanism, said clutches being operatively associated with the steering mechanism.

This type of driving mechanism may be applied either to a front or to a rear wheel drive, but is more particularly intended for a front drive. However, when the driving power is applied directly to the wheels, by means of a friction clutch, there is a possibility of the clutch slipping, during periods of high torque, so that in practice, a friction clutch may not be considered quite as reliable as a positively interlocking clutch would be.

At the same time, the use of a friction clutch entails certain advantages that make it a very desirable method of effecting a gradual connection between a stationary rotatable element and another element rotating at a relatively high speed. This is especially important when starting a car when the motor shaft rotates at a very high speed and the transmission shaft must be connected to it while its speed is nil.

The driving mechanism forming the object of my present invention, insures an absolutely positive connection between the shaft and the wheels during the periods of driving so that the torque of the shaft is transmitted to the wheels in its entirety; and it also insures operation of the means for connecting the wheels to and for disconnecting them from the shaft, whereby the connection takes place gradually by means of a friction clutch when the car is started, before the positive connecting means enter into play.

This application refers partly to features forming the object of another application filed by me February 2, 1928, which became abandoned on April 4, 1929, and partly to improvements thereon.

My invention will be more clearly understood by referring to the accompanying drawings, in which:

Fig. 1 is a fragmentary sectional view in elevation of one end of the front axle of a motor car embodying my invention, showing a wheel mounted thereon;

Fig. 2 is a fragmentary cross sectional view in elevation through line 2—2 of Fig. 1;

Fig. 3 is a plan view in a reduced scale illustrating the means under the control of the driver for operating the clutch connections;

Fig. 4 is a fragmentary sectional view in elevation in an enlarged scale through line 4—4 of Fig. 3;

Fig. 5 is a fragmentary cross sectional view in elevation in an enlarged scale through line 5—5 of Fig. 3;

Fig. 6 is a fragmentary plan view of a portion of the front axle;

Fig. 7 is a fragmentary rear view in elevation thereof; and

Fig. 8 is a detail side view in elevation illustrating the manner of controlling the wheel clutches.

Referring to said drawings 10, 11 designate two front wheels of a motor vehicle, each wheel comprising a web 12 and a hub portion 13 mounted on ball or roller bearings 14 carried by end 15 of hollow axle 16 made integral with steering knuckle 16'.

The hub 13 is formed integral with a friction clutch cup portion 17 within which is located a friction clutch or drum 18 carried by the outer end of a hollow spindle 19. 20 designates the driving shaft provided at each end with a universal joint 21 connecting said driving shaft to a square sectioned axially directed shank 22 projecting within steering knuckle 16'. A sleeve 23 is slidably mounted upon and extends outwardly of the outer end of shank 22, the outer end of said sleeve being formed with a square chamber 24 within which is inserted the inner end 25 of hollow spindle 19.

By virtue of this arrangement, it will be seen that the rotation of square shank 22 can be transmitted to sleeve 23 and through the latter to hollow spindle 19, while sleeve 23 can be shifted axially of shank 22 and spindle 19.

Another spindle 26 is inserted through and projects outwardly of spindle 19, the outer end 27 of said spindle carrying a toothed crown 28, the teeth 29 of which are adapted to intermesh with teeth 30 provided on the outer face of flange 31 of hub portion 13. Spindle 26 is mounted within spindle 19 so as to be slidable therein, while being constrained to rotate therewith, in any suitable manner, for instance, by means of a key and key seat 33.

When spindle 26 is in the position shown where geared crown 28 is in mesh with teeth 30, its inner end 34 abuts against a plate 35 resting against the shoulder formed by the bottom of chamber 24 in sleeve 23.

By virtue of this construction, if sleeve 23 is shifted outwardly along shank 22, spindle 26 will also be forced outwardly so that teeth 29 will become disengaged from teeth 30. The outer end of spindle 26 is turned down to form a portion 36 having a smaller diameter so as to accommodate a pressure spring 37, inserted between said portion 36 and the cavity within spindle 19. Said spring is held in position by a nut 38 screwed onto the outer end of spindle 19, and tends at all times to retain spindle 26 in its inward position shown.

In a similar manner spindle 19 may be axially displaced in an outward direction in relation to axle 15 so as to disengage drum 18 from surface 17. However, said spindle is normally retained in its inward position shown by a spring 39, pressing against a plate 40 resting against a collar 41 screwed onto spindle 19, said spring being maintained under tension by a nut 42 screwed onto the outer end of axle 15. A ball bearing structure 43 is interposed between nut 42 and the spring so as to permit said spring to rotate together with axle 19 while nut 42 and axle 15 remain stationary.

Another ball bearing structure 44 is mounted at the outer end of sleeve 23, said structure comprising a thrust plate 45 against which press the two fingers of a forked portion 46 of a lever 47 pivotally mounted at 48 onto the steering knuckle. The steering knuckle is pivotally mounted onto the axle frame, which is composed on central casing 49, upper bridge portion 50 and lower bridge portion 51, so as to rotate about a vertical axis in the customary manner.

To this end, the same is formed with an upper pivotal portion 52 and a lower pivotal portion 53 coaxial therewith. The upper pivotal portion is provided with an opening, 54 through which upwardly projects an extension 55 of forked lever 47. Said extension is used to operate the lever so that if an inward pull is exerted on said extension, the forked portion 46 will press against plate 45 and will force sleeve 23 to move outwardly at the same time causing outward movement of spindle 26 and toothed crown 28.

The outer end surface of sleeve 23 is spaced a certain distance 56 from the inner surface of collar 41, so that when sleeve 23 is first forced outwardly by the action of lever 46, spindle 19 still remains in its normal position. However, as soon as toothed crown 28 has become disengaged from teeth 30, the outer end surface of sleeve 23 meets the inner surface of collar 41, and the sleeve will therefore begin to force outwardly spindle 19 causing the disengagement of the friction clutch associated therewith.

When lever 47 is operated in the manner indicated therefore, the toothed clutch is first disengaged from the wheel and then the friction clutch is disengaged and when lever 46 is returned to its normal position, the friction clutch will become engaged first and the toothed clutch afterwards.

The arms 55, 55' of levers 47, are arranged to be moved simultaneously so as to disconnect the clutches of both wheels at the same time or else independently of each other, so as to disconnect the clutches of one or the other wheel only. The clutches of both wheels should be disconnected when the motor is started thus replacing the action of the clutch now ordinarily used for the main transmission shaft; while the outer wheel only should be disconnected when the car is taking a turn to the right or to the left, due to the difference between the speed of rotation of the inner wheel and that of the outer wheel thus replacing the action of the differential now used in connection with rear axle drives.

The simultaneous disconnection of both wheels is effected by means of a pedal 57 mounted on a horizontal transversal shaft 58 within convenient reach of the foot of the operator as shown in Figs. 4, 5.

Shaft 58 is rotatably mounted on two supports 59, 60 and carries a lever 61 provided with a forked end 62 engaging a collar portion 63 of a slidable rod 64 mounted in a front to rear direction on a bracket 65. When pressure is exerted against pedal 57 the same is angularly displaced in a counterclockwise direction with reference to Fig. 5, causing rod 64 to move towards the rear.

This movement of rod 64 takes place against the action of a spring 66 bearing against a collar 67 fixed on said rod, normally maintaining the rod in its inoperative position shown. The front end of rod 64 is provided with a forked member 68 carrying a pulley 69 which is embraced by a loop portion 70 of a cable, the two strands of which 71, 71' are caused to pass over two idle pulleys 73, 74 and are turned at right angle one to the right and the other to the left. The extreme ends of said strands are connected to the outer ends of levers 55, 55', respectively, as shown at 75, 75'.

It will be seen that by virtue of this arrangement, when rod 64 is withdrawn by the action of pedal 57, both strands 71, 71' will be pulled inwardly at the same time, thus causing levers 47 to simultaneously disconnect the clutches of both wheels. This allows the driver to start the motor and when the pressure on the pedal is released spring 66 returns rod 64 to its normal position and springs 37, 39 reestablish the clutch connections in their proper sequence as explained before.

The disconnection of one wheel while the other wheel remains connected to the driving shaft is effected by operating the corresponding lever 47 so as to force the wheel clutches outwardly, while the other lever 47 remains inoperative in relation to the clutches controlled thereby.

It will be observed that the clutches are only operated by each of the levers 47, when the forked portion 46 of said levers is moved in an outward direction while if the forked portion is moved inwardly, no change occurs in the operative parts. Arms 55, 55' are therefore connected by a transversal bar 76 which when moved toward the left will move arm 55 inwardly causing the disconnection of the clutches of the wheel at the right shown in Fig. 1, while the clutches of the wheel 10 at the left remain unaffected.

In a similar manner, when bar 76 is moved to the right, arm 55' may be operated to disengage the clutches of wheel 10, while arm 55 will be entirely unaffected, the connection between bar 76 and arms 55, 55' being effected by means of slots such as 76'.

Bar 76 is operatively associated with the steering mechanism so as to be automatically operated in one or the other direction according to whether the car is steered to the right or to the left. The operation of the steering mechanism will cause the steering knuckles to move angularly about their vertical pivots in the customary manner, and therefore the center of pivots 48 coincides with the vertical axis of pivotal supports 52, 53.

Furthermore, in order to allow the angular movements of the steering knuckles together with levers 47 carried thereby an articulated connection 77 is provided between each end of bar 76 of the corresponding arm 55 or 55'.

Connection 77 is attached to bar 76 by means of a vertical pin 78 and is attached to arm 55 or 55' by means of a horizontal pin 79 and thus acts as a link permitting movements of arms 55, 55' in relation to bar 76 which is guided to move in a straight path by pins such as 79, passing through slots such as 80. (See Fig. 6.)

The operative connection between bar 76 and the steering mechanism is effected by means of a lug 81, rearwardly extending from said bar and a crank lever 82 pivotally mounted at 83 onto a bracket 84 having a longitudinally directed arm 85 connected to said lug 81 at 86. Said crank lever also has a laterally extending arm 87 which is connected to and operated by a longitudinally directed connection 88, said connection being operated by a bar 89 slidable within a support 90, said bar being connected to said connection at 91.

The steering mechanism comprises the usual steering wheel 92 and steering shaft 93, said shaft carrying a worm 94 operating a worm wheel 95 mounted on a horizontal shaft 96. Said shaft carries an arm 97, which is connected to another arm 98 integral with the steering knuckle at the left by a connection 99.

Arm 98 is made integral with another arm 100 which is connected to arm 101 integral with the steering knuckle at the right by a connecting rod 102. By means of this arrangement, the operation of hand wheel 92 will cause steering of the car in one or the other direction in a well known manner. Shaft 96 also carries a segment 103 provided with a central notch 104, within which normally projects the tip end of a downwardly directed arm 105 of a lever 106 pivotally mounted at 107, said lever also having an upwardly extending arm 108, the tip end of which is connected to the rear end of rod 89 at 109.

The tip end 110 of arm 105 has a round section, and normally cooperates with notch 104 in maintaining lever 106 in the vertical position indicated in Fig. 8, this position corresponding to the neutral position of bar 76. When shaft 96 is rotated in a clockwise direction with reference to Fig. 8, so as to steer the car to the left with reference to Fig. 3, notch 104 will cause lever 106 to be angularly displaced in a counterclockwise direction, until tip end 110 rests against the peripheral surface 111 of segment 103.

This results in rod 89 and connection 88 being moved rearwardly causing bar 76 to move to the left thus disconnecting the clutches of wheel 11 at the right. A combination of the steering movement in the same direction will not further affect the status of bar 76 which will not resume its neutral position until segment 103 has been returned to normal together with lever 106.

In a similar manner if shaft 96 is rotated in a counterclockwise direction so as to steer the car to the right, segment 103 will cause lever 106 to be angularly displaced in a clockwise direction, thus moving rod 89 and connection 88 forward, causing bar 76 to move towards the right so as to disconnect the clutches of wheel 10 at the left.

In this manner, the disconnection of one or the other wheel takes place automatically upon the steering of the car in one or the other direction. Driving shaft 20 may be operated by a worm wheel 112 driven by a worm 113 mounted on motor shaft 114 or in any other suitable manner.

My improved arrangement whereby the action of a friction clutch is supplemented by that of a geared clutch permits of taking full advantage of the method of frictional connection before the positive connection is allowed to come into play. Once the positive connection has been established, the full torque of the driving shaft will be transmitted to the wheels so that all possibility of slippage will be prevented. This feature is especially valuable when driving up-hill when the most severe torque conditions are imposed upon the driving shaft.

The two clutches provided for each wheel can be conveniently mounted and operated by using a hollow axle formed integral with each steering knuckle, as shown and described; this feature which is new constitutes therefore one of the important constructional details of my invention.

It is obvious that my inventive idea may be applied in ways other than that shown and therefore the drawings will be understood as being intended for illustrative purposes only and not in a limiting sense.

I accordingly reserve the right to carry my invention into practice in all those ways and manners which may enter, fairly, into the scale of the appended claims.

I claim:

1. In a device of the class described, the combination, with a hollow axle and a wheel rotatably mounted on said axle, of a hollow spindle axially shiftable within said axle, a friction clutch carried by said spindle, an additional spindle axially shiftable within said hollow spindle, a positive clutch carried by said additional spindle, and a clutch operating member adapted to shift first said positive clutch and then said friction clutch out of engagement with said wheel when said operating member is moved in a given direction.

2. In a device of the class described, a pair of wheels, a hollow axle for each wheel, a steering mechanism, a hollow spindle axially shiftable within each axle, a friction clutch carried by each spindle, an additional spindle shiftable within each hollow spindle, a positive clutch carried by each additional spindle, a clutch operating member for each axle, adapted to shift first said positive clutch and then said friction clutch out of engagement with the corresponding wheel, when said operating member is moved in a given direction, a member actuating each operating member, a connection extending between said clutch actuating members, causing one or the other of said members to disconnect its corresponding clutches, when said connection is shifted in one or the other direction, and means operatively associating said connection with said steering mechanism.

3. In a device of the class described, the combination, with an axle, a wheel mounted at each end thereof, a clutch for connecting each wheel to said axle, and a clutch actuating member for each clutch, of a flexible connection extending between said clutch actuating members, and pedal controlled means slidably inserted over said connection, at a point intermediate its ends, for exerting a pull thereon causing the simultaneous operation of said clutch actuating members.

4. In a device of the class described, the combination, with an axle, a wheel mounted at each end thereof, a clutch for connecting each wheel to said axle, and a clutch actuating member for each clutch, of means for connecting said clutch actuating members to each other, causing one or the other of said members to disconnect its respective clutch, when said connecting means is shifted in one or the other direction, a flexible member directly connecting said clutch actuating members to each other, and pedal controlled means slidably inserted over said flexible member at a point intermediate its ends, for exerting a pull thereon, causing the simultaneous operation of said clutch actuating members.

5. In a device of the class described, a pair of wheels, a hollow axle for each wheel, a steering mechanism, a hollow spindle axially shiftable within each axle, a friction clutch carried by each spindle, an additional spindle shiftable within each hollow spindle, a positive clutch carried by each additional spindle, a clutch operating member for each axle, adapted to shift first said positive clutch and then said friction clutch out of engagement with the corresponding wheel, when said operating member is moved in a given direction, a member actuating each operating member, a connection extending between said clutch actuating members, causing one or the other of said members to disconnect its corresponding clutches, when said connection is shifted in one or the other direction, a cam-acting member, associated with said steering mechanism, causing said connecting means to move in one or the other direction, according to the direction of movement of said steering mechanism, a flexible connection extending between said clutch actuating members, and pedal controlled means for exerting a pull on said flexible connection, at a point intermediate its ends, causing the simultaneous operation of said clutch actuating members.

6. In a device of the class described, a pair of wheels, a hollow axle for each wheel, a steering mechanism, a hollow spindle axially shiftable within each axle, a friction clutch carried by each spindle, an additional spindle shiftable within each hollow spindle, a positive clutch carried by each additional spindle, a clutch operating member for each axle, adapted to shift first said positive clutch and then said friction clutch out of engagement with the corresponding wheel, when said operating member is moved in a given direction, means tending to maintain both clutches in their operative position, a member actuating each operating member, a connection extending between said clutch actuating members, causing one or the other of said members to disconnect its corresponding clutches, when said connection is shifted in one or the other direction, a cam-acting member, associated with said steering mechanism, causing said connecting means to move in one or the other direction, according to the direction of movement of said steering mechanism, a flexible connection extending between said clutch actuating members, and pedal controlled means for exerting a pull on said flexible connection, at a point intermediate its ends, causing the simultaneous operation of said clutch actuating members.

OTTAVIO ZANCAN.